United States Patent
Wang et al.

(10) Patent No.: US 8,576,579 B2
(45) Date of Patent: Nov. 5, 2013

(54) MOUNTING AND FIXING APPARATUS FOR ANALOG-TO-DIGITAL ELECTRICAL EQUIPMENT

(75) Inventors: Xianfeng Wang, Nanchang (CN); Gang Yan, Zunyi (CN)

(73) Assignee: Zhejiang Chint Electrics Co., Ltd., Wenzhou, Zhejiang (CN)

( * ) Notice: Subject to any disclaimer, the term of this patent is extended or adjusted under 35 U.S.C. 154(b) by 694 days.

(21) Appl. No.: 12/377,855

(22) PCT Filed: Aug. 16, 2007

(86) PCT No.: PCT/CN2007/002472
§ 371 (c)(1),
(2), (4) Date: May 28, 2010

(87) PCT Pub. No.: WO2008/022558
PCT Pub. Date: Feb. 28, 2008

(65) Prior Publication Data
US 2011/0164393 A1    Jul. 7, 2011

(30) Foreign Application Priority Data
Aug. 17, 2006  (CN) .......................... 2006 1 0109465

(51) Int. Cl.
| H05K 7/02 | (2006.01) |
| H05K 7/04 | (2006.01) |
| H05K 7/00 | (2006.01) |
| H02B 1/20 | (2006.01) |
| H01R 9/26 | (2006.01) |

(52) U.S. Cl.
USPC ............ 361/809; 361/652; 361/837; 439/716

(58) Field of Classification Search
USPC ................. 361/673, 809, 634, 652, 810, 837; 439/716, 729, 816, 94, 532; 200/293, 200/293.1; 174/359
See application file for complete search history.

(56) References Cited

U.S. PATENT DOCUMENTS

| 6,431,909 B1 * | 8/2002 | Nolden et al. ................ 361/810 |
| 2006/0223372 A1 * | 10/2006 | Van Der Mee et al. ....... 174/359 |
| 2008/0186657 A1 * | 8/2008 | Weber et al. .................. 361/673 |

FOREIGN PATENT DOCUMENTS

| CN | 2585530 | 11/2003 |
| CN | 2759104 | 2/2006 |

(Continued)

OTHER PUBLICATIONS

English Machine Translations and Original both Christian and Urbain have been attached.*

(Continued)

*Primary Examiner* — Timothy Thompson
*Assistant Examiner* — Roshn Varghese
(74) *Attorney, Agent, or Firm* — Fish & Richardson P.C.

(57) ABSTRACT

A mounting and fixing apparatus for analog-to-digital electrical equipment according to an embodiment of the present invention comprises: a mounting rail (11), an electrical equipment-insulated pedestal (12) and a stop element (16). By translation and locking of the stop element (16) mounted on the electrical equipment-insulated pedestal (12), the dimension of the opening mounting and fixing the electric equipment to the mounting rail (11) may be manually varied or locked, which greatly improves the firmness and stability for mounting the electric equipment, and thereby realizing convenient mounting and dismounting of the electric equipment or convenient movement or rearrangement of the electric equipment in the mounting rail (11), and enhancing the interchangeability and compatibility for coordination and mounting of the electric equipment to the mounting rail (11).

12 Claims, 8 Drawing Sheets

(56) References Cited

FOREIGN PATENT DOCUMENTS

| | | | |
|---|---|---|---|
| CN | 2009-41719 | | 8/2007 |
| DE | 3513762 | A1 | 10/1986 |
| DE | 4117465 | A1 * | 12/1991 |
| EP | 1119085 | A1 | 7/2001 |
| EP | 1460722 | A1 | 9/2004 |
| FR | 2652205 | A1 * | 3/1991 |
| GB | 2216177 | A | 10/1989 |
| JP | 10-013052 | | 1/1998 |
| KR | 2004-0098095 | | 11/2004 |

OTHER PUBLICATIONS

Extended European Search Report for Application No. 07785367.9-1242/2053910 dated Jan. 27, 2011 (6 pages).

International Search Report from PCT/CN2007/002472, dated Nov. 29, 2007, and English translation thereof (6 pages).

Australian Examiner's first report on patent application No. 2007287949 dated Apr. 18, 2012, 2 pages.

Australian Notice of Acceptance for patent application No. 2007287949 dated Mar. 5, 2013, 3 pages.

* cited by examiner

Fig. 1

PRIOR ART

MOUNTING AND FIXING APPARATUS FOR ANALOG-TO-DIGITAL ELECTRICAL EQUIPMENT

FIELD OF THE INVENTION

The present invention relates to a mounting and fixing apparatus for analog-to-digital electrical equipment, and in particular, relates to a mounting and fixing apparatus for analog-to-digital electrical equipment suitable for a standardized rail.

BACKGROUND OF THE INVENTION

A terminal electric equipment is one mounted to the end of a circuitry, for performing power distribution, control, protection, adjustment and alarm, etc to relevant circuitry and powered devices. The earliest analog-to-digital electrical equipment is a combination of analog-to-digital terminal electrical equipments, electric and mechanical connections therebetween, and a shielding housing, etc. Such analog-to-digital combination of terminal electrical equipments (for example, a switch, socket, ammeter, leakage protector, mini circuit breaker, contactor, relay, and monitor, etc) mounted at the end of a power line began popular in the middle of 1980s, when some French and German companies had sequentially unveiled analog-to-digital terminal electrical equipments and combined electrical equipments with a mounting rail of 9 mm in width. Since analog-to-digital electrical equipments are easy to be assembled into multi-purpose combined electrical equipments, they have been widely applied in household, commercial and industrial fields and the like, as well as in high-rise buildings, residential buildings, hospitals, ports and stations.

The analog-to-digital electrical equipments are typically designed and manufactured from the perspective of system and complete set, with comprehensive consideration of various kinds of user's requirements, thus analog-to-digital electrical equipments have characteristics of rail mounting, analog-to-digital size, multiple functions, artistic molding and safety in use, etc.

All electrical equipment-insulated pedestals of an analog-to-digital electrical equipment are clipped on a mounting rail, thus the issues of proper clipping tightness and whether to facilitate assembly and management of the rail mounting have gained increasing attention from the manufacturers and users. The most fundamental technical requirements for a mounting and fixing apparatus for an analog-to-digital electrical equipment are such that: as required by a user, the terminal electrical equipment should be conveniently mounted to and dismounted from the mounting rail and firmly attached on the mounting rail; and besides, there should have good interchangeability and compatibility between the mounting rail and the electrical equipment, thereby easy to move or rearrange the terminal electrical equipment on the mounting rail.

The mounting and fixing apparatus for an analog-to-digital electrical equipment marketed currently is hard to mount and dismount transversely the terminal electrical apparatus along the mounting rail, because the dimension of the openings that are provided on the electrical equipment-insulated pedestals of the electrical equipments and fixedly linked to the mounting rail is required to be substantially equal to the dimension of the width of the mounting rail and unchangeable as well. After a group of electrical equipments comprising a plurality of terminal electrical equipments are wired to an omnibus bar, if it is necessary to replace one or several electrical equipments thereof, all bolts fixing the omnibus bar have to be unscrewed, and then the electrical equipments required to be replaced can be taken out until the omnibus bar is dismounted. Apparently, the prior art fixing and mounting apparatus is quite time-consuming and difficult for replacing electrical equipments, which causes extreme inconvenience to the user for assembly and management.

Figure 1:
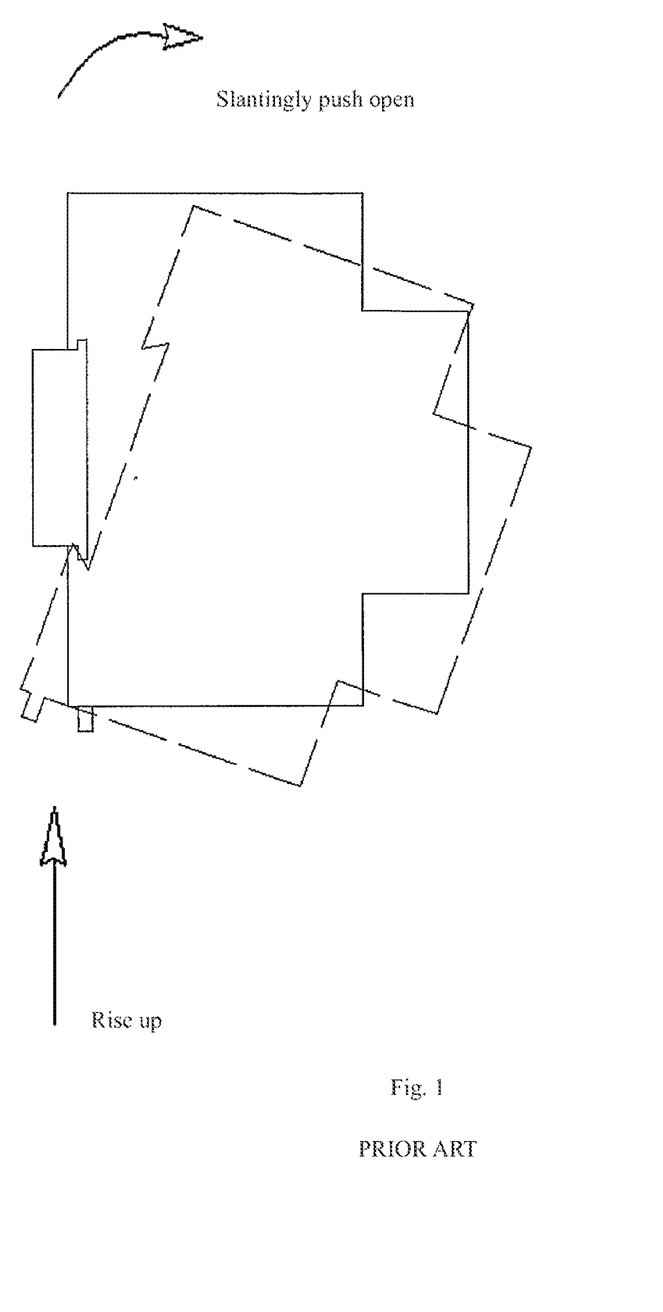
FIG. 1 is a diagram of the mounting and dismounting method for a mounting and fixing apparatus for a prior art analog-to-digital electrical equipment.

The prior art mounting and fixing apparatus for an analog-to-digital electrical equipment as shown in FIG. 1 employs a mounting and dismounting method such that: by rotationally pressing-in the electrical equipment transversely along the mounting rail, the electrical equipment is embedded into the mounting rail; and by slantingly rotating the electronic equipment transversely along the mounting rail, the electrical equipment is released and dismounted from the mounting rail. Apparently, the design structure of the prior art mounting and fixing apparatus can not change the dimension of the openings provided on the electrical equipment-insulated pedestals of the electric equipment and fixedly linked to the mounting rail, which results in poor interchangeability and compatibility between the electrical equipment and the mounting rail, thus it is impossible to move the terminal electrical equipment transversely along the mounting rail. In particular, after the group of terminal electrical equipments are wired into the omnibus bar, it requires screwing of all the bolts of the fixed omnibus bar, and only thereafter can one or several electrical equipments required to be replaced be taken out, thus the operation is quite difficult and time-consuming, which is extremely inconvenient for assembly and management.

SUMMARY OF THE INVENTION

In view of overcoming the above drawbacks in the prior art, an objective of the present invention is to provide a fixing and mounting apparatus for an analog-to-digital electrical equipment for satisfying various requirements of users, which is easy to move or rearrange the electrical equipment on a mounting rail, making terminal electrical equipments easy to mount and dismount, convenient for replacement, firm and stable in mounting, thus apparently improving the interchangeability and compatibility between the mounting rail and the electrical equipment and reducing the production costs.

To achieve the above objectives, the present invention adopts the following solutions:

A mounting and fixing apparatus for analog-to-digital apparatus comprises: a standardized mounting rail, an electrical equipment-insulated pedestal of a terminal electrical equipment, and a hook structure integrally formed with the electrical equipment-insulated pedestal of the terminal electrical equipment, the electrical equipment-insulated pedestal being provided thereon all functional members of the terminal electrical equipment, and the hook structure being formed by fixing protrusions and fixing recesses, for clipping the electrical equipment-insulated pedestal to the standardized mounting rail. The fixing and mounting apparatus for analog-to-digital electrical equipment according the present invention further comprises a stop element attached to one end of a bottom of the electrical equipment-insulated pedestal, the stop element is provided thereon with an L-shaped structure formed by a slanting surface and a shoulder protrusion, and attached to the mounting rail, the L-shaped structure working together with the hook structure formed on the other end of the electrical equipment-insulated pedestal to firmly clip the electrical equipment-insulated pedestal on the standardized mounting rail. A locking protrusion is provided on the stop element and performs a locking function of the stop element together with locking holes formed on the electrical equipment-insulated pedestal. A pair of guide-rail structures for attaching the electrical equipment-insulated pedestal to the stop element, such that the stop element is operative to translate between the locking and unlocking positions, i.e. moving along the transverse direction of the mounting rail via the guide-rail structures. Through locking the stop element and the electrical equipment-insulated pedestal, the electrical equipment-insulated pedestal is fixedly mounted on the mounting rail; by manually unlocking the stop element and the electrical equipment-insulated pedestal, the stop element may translate on the electrical equipment-insulated pedestal, thereby varying the distance between the hook structure and the L-shaped structure on the stop element, such that the terminal electrical equipment is operative to be dismounted from the mounting rail or rearranged on the mounting rail.

The guide-rail structure comprises a pair of guide-rail guide slots and a pair of guide-rail slide blocks, the pair of guide-rail guide slots is provided on the electrical equipment-insulated pedestal for hearing guide-rail slide blocks provided on two sides at one end of the stop element. Contrarily, the guide-rail guide slots and the guide-rail sliding blocks may also change their positions, that is, the guide-rail guide slots are provided on two sides of one end of the stop element, and the guide-rail sliding blocks are provided on the electrical equipment-insulated pedestal. At entrance ends of the guide-rail sliding blocks or entry ends of the guide-rail guide slots are provided with fillets adapted for guiding the guide-rail sliding blocks into the guide-rail guide slots.

At one end of the stop element facing toward the mounting rail is provided an elastic link stopper. An L-shaped structure formed on a front edge of the elastic link stopper and the hook structure on the electrical equipment-insulated pedestal form an opening fixedly attached to the mounting rail. The L-shaped structure is provided on the elastic link stopper at one end of the stop element, the elastic link stopper being supported on an elastic structure of a U-shaped cross-section and firmly clamping the mounting rail by elastic force of the elastic structure of the U-shaped cross-section. Elongate bars are further provided on reverse extension lines at two sides of the elastic link stopper, for preventing the elastic link stopper from rotating or moving when subject to external force. The L-shaped structure, elastic link stopper, elastic structure of U-shaped cross-section, elongate bars and the stop element are integrally formed into one piece.

At the other end of the stop element is provided an elastic tongue-shaped plate. On an end face of the tongue-shaped plate facing the electrical equipment-insulated pedestal is provided a locking protrusion having thereon an end face vertical to the tongue-shaped plate and a slanting face slanting to the tongue-shaped plate plane. The tongue-shaped plate has a function of elastic deformation. At a bottom of the electrical equipment-insulated pedestal is provided a bottom surface having a locking hole. When the slanting face is in contact with the bottom surface of the electrical equipment-insulated pedestal, the tongue-shaped plate is in a state of elastic deformation; when the slanting face is concurrent with the locking hole at the bottom of the electrical equipment-insulated pedestal, due to the elasticity of the tongue-shaped plate, the locking protrusion is adapted to fall into the locking hole at the bottom of the electrical equipment-insulated pedestal. At this time, the L-shaped structure on the elastic link stopper exactly locks the mounting rail, and meanwhile the end face on the locking protrusion is in contact with the vertical face inside the locking hole at the bottom of the electrical equipment-insulated pedestal, such that the locking protrusion is clipped inside the locking hole, and thereby the stop element is locked, thereby realizing mounting and fixing the electrical equipment to the mounting rail. When a tool like a screwdriver projects into a head portion of the stop element, upon a slight pressure exerted on the tongue-shaped plate so as to make it deform to a certain position, the locking protrusion may be released from the locking hole, such that the stop element is freed from the locking state and is operative to translate along longitudinal direction of the guide rail, thereby realizing dismounting or replacing the electrical equipment directly from the mounting rail.

An mousing-hook is provided at a face of the stop element adjacent to the electrical equipment-insulated pedestal; an mousing-slot linked to the locking hole is provided on the electrical equipment-insulated pedestal, for bearing the mousing-hook on the stop element such that the mousing-hook may move inside the locking hole and the mousing-slot which are at the bottom surface of the electrical equipment-insulated pedestal. A vertical face is provided inside the locking hole, for clipping the locking protrusions and mousing-hook on the stop element; the mousing-hook and the elastic link stopper are integrally manufactured so as to prevent the stop element from escaping away from the electrical equipment-insulated pedestal; at a face of one end of the mousing-hook adjacent to the electrical equipment-insulated pedestal is provided a slanting face for facilitating the stop element to be pressed into the electrical equipment-insulated pedestal. The locking hole and the mousing-slot may be the same hole or slot.

The electrical equipment-insulated pedestal may be integrally manufactured with the electric equipment product. An alternative solution is such that, the electrical equipment-insulated pedestal is a transitional piece for connecting the electrical equipment product body and the mounting rail, for example, auxiliary pieces such as an underlay block, or a base etc.

The stop element is provided with a lug mountable with a protective cover, for fixing and mounting the protective cover. A square hole is provided on the protective cover plate. By clipping the square hole and the lug on the stop element, the protective cover plate is mounted to the stop element.

To sum up, the characteristics of the technical solution of the present invention are that: the stop element mounted on the electrical equipment-insulated pedestal is operative to translate a certain distance along the longitudinal direction of the guide rail (i.e. transverse to the mounting rail), such that the size of the opening mounting and fixing the electrical equipment to the mounting rail, i.e. the distance between the hook structure on the electrical equipment-insulated pedestal and the L-shaped structure on the elastic link stopper, may be manually varied, which thus facilitates the transversal mounting and dismounting of the electrical equipment on the mounting rail; the stop element is configured to translate on the electrical equipment-insulated pedestal and at the same time lock the size of the opening which mounts and fixes the electrical equipment to the mounting rail such that the electrical equipment is firmly and stably mounted on the mounting rail; since the size of the opening is variable, a fixed connecting manner using elastic clipping is adopted between the L-shaped structure and the mounting rail, thereby improving the exchangeability and compatibility for fixation, attachment and cooperation between the electrical equipment and the mounting rail.

The mounting and fixing apparatus for analog-to-digital electrical equipment according to the present invention can readily and conveniently implement mounting, fixing, dismounting and replacing various kinds of electrical equipments and standardized mounting rails, in particularly very easily and conveniently implement moving or rearranging various terminal electrical equipments in omnibus bar wiring manner on the mounting rail.

DESCRIPTION OF THE PREFERRED EMBODIMENTS

Hereinafter, an embodiment of the mounting and fixing apparatus for an analog-to-digital electrical equipment according to the present invention is described in detail with reference to the accompanying drawings. The mounting and fixing apparatus for an analog-to-digital electrical equipment according to the present invention is not limited to the embodiments as shown in the figures and other alternative solutions as described in the specification.

Figure 2:
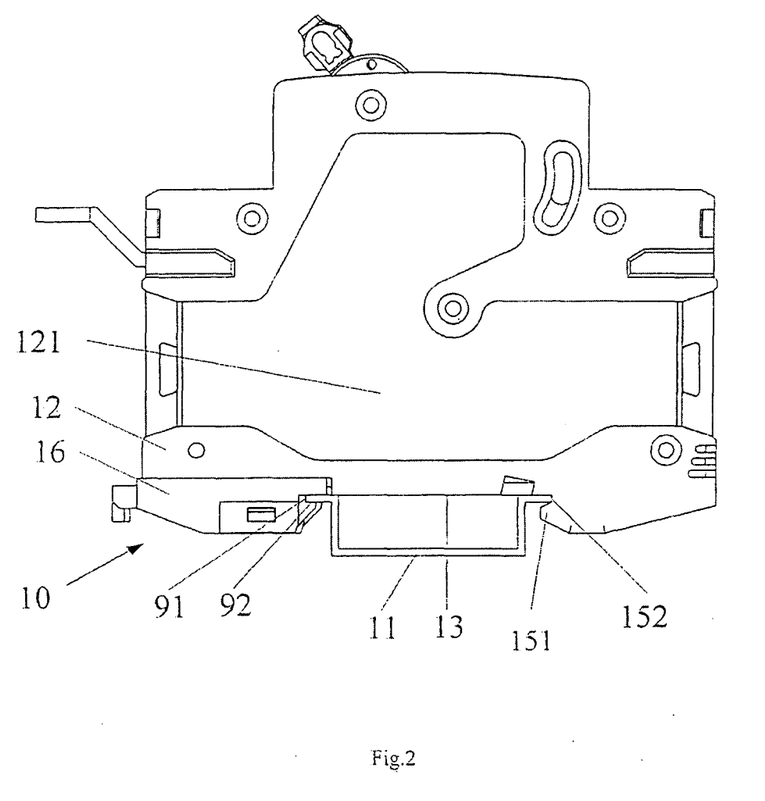
FIG. 2 is a planar view for assembling a mounting and fixing apparatus for an analog-to-digital electrical equipment according to an embodiment of the present invention.

From FIG. 2, it is seen that the mounting and fixing apparatus for an analog-to-digital electrical equipment according to an embodiment of the present invention comprises: a TH-type (also called "top hat type") mounting rail 11, an electrical equipment-insulated pedestal 12 and a stop element 16. On the electrical equipment-insulated pedestal 12 is provided a functional member 121 of the electrical equipment. The stop element 16 is mounted at one end of the electrical equipment-insulated pedestal 12, on the other end of which are provided with a fixing protrusion 151 and a fixing recess 152 which form a hook structure connecting the electrical equipment-insulated pedestal 12 to the mounting rail 11. At one end of the stop element 16 is provided a shoulder protrusion 91 and a slanting face 92 which form an L-shaped structure connecting the stop element 16 to the mounting rail 11. The hook structure on the electrical equipment-insulated pedestal 12 and the L-shaped structure on the stop element 16 form an opening connecting the insulated pedestal 12 to the mounting rail 11, thereby mounting and fixing the insulated pedestal 12 to the mounting rail 11.

Figure 3:
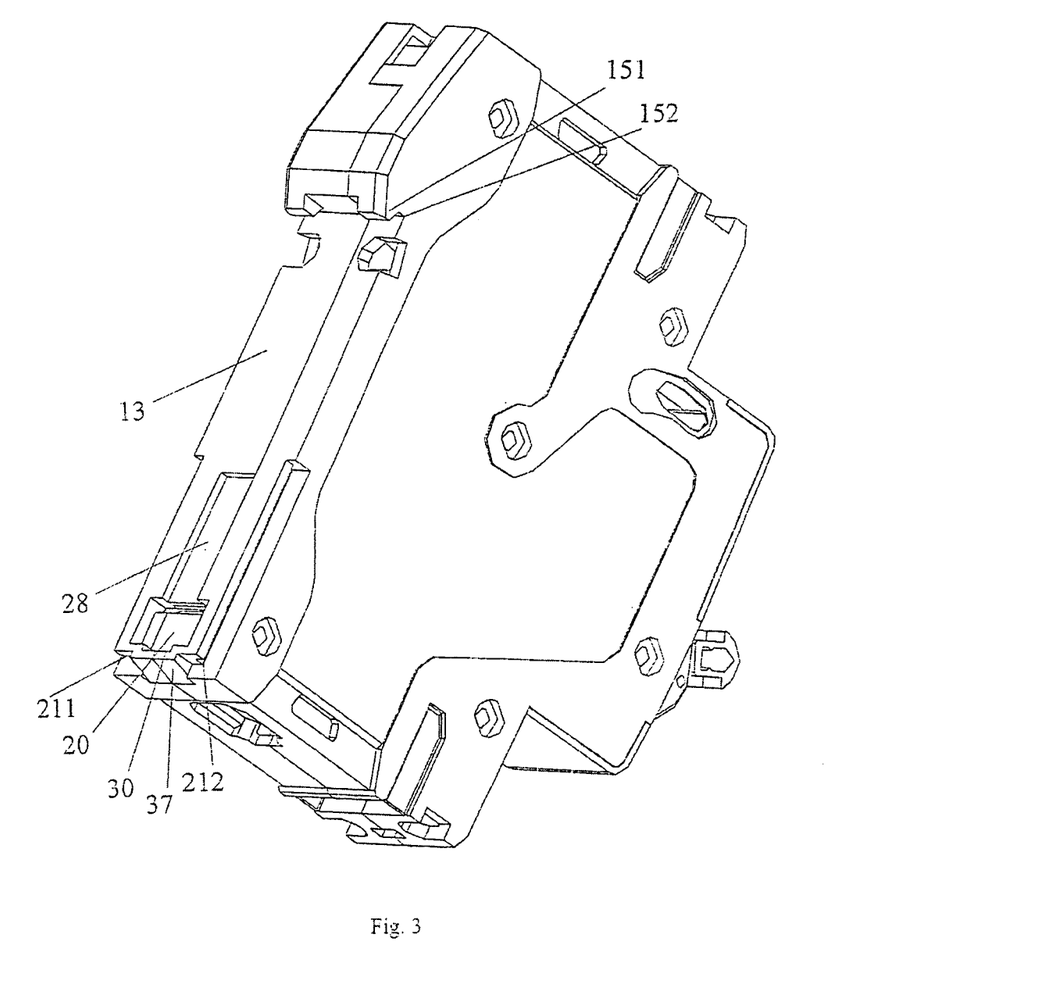
FIGS. 3 and 4 are three-dimensional views of an electrical equipment-insulated pedestal of the mounting and fixing apparatus for an analog-to-digital electrical equipment as shown in FIG. 2 from two angles according to the present invention.
Figure 4:
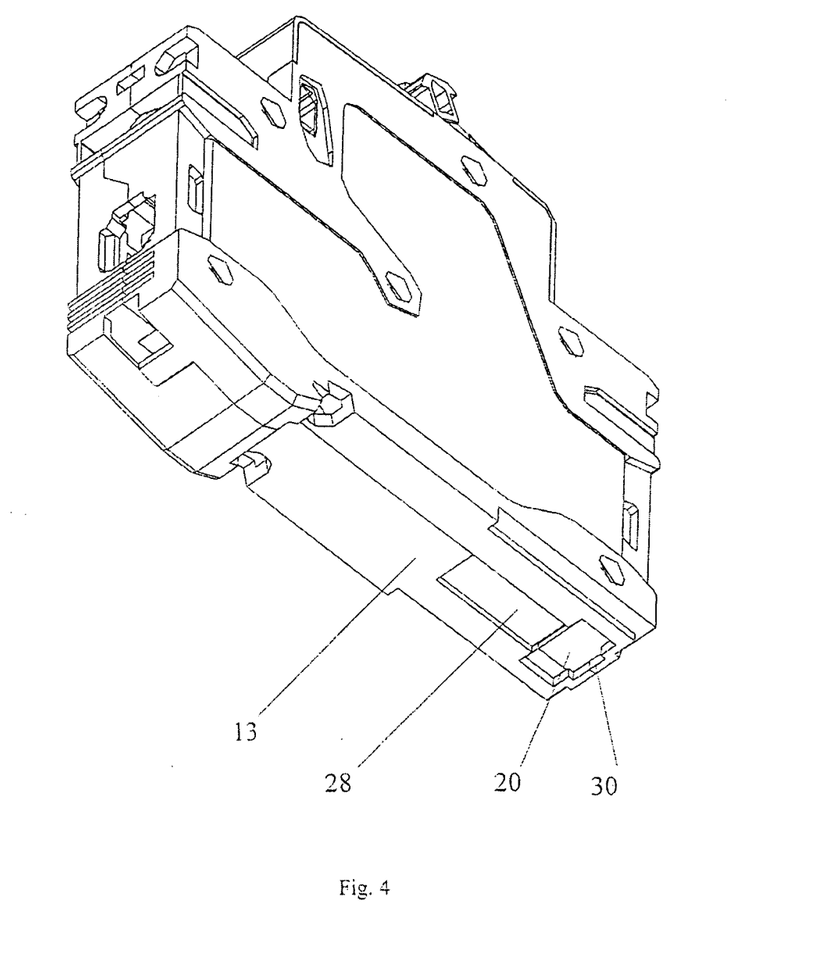
Figure 5:
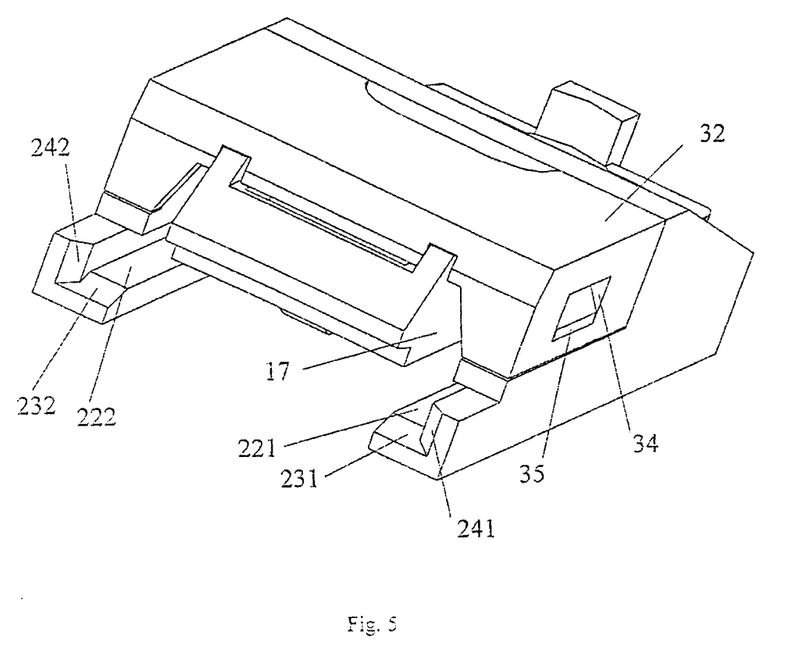
FIGS. 5, 6, and 7 are three-dimensional views of a stop element of the mounting and fixing apparatus for an analog-to-digital electrical equipment as shown in FIG. 2 from three angles according to the present invention.

It is seen from FIGS. 3 and 4 that, one end of the electrical equipment-insulated pedestal 12 of the mounting and fixing apparatus for an analog-to-digital electrical equipment according to an embodiment of the present invention is provided with a pair of guide-rail guide slots 211 and 212, for bearing guide-rail slide blocks 221 and 222 provided on the stop element 16 (see FIG. 5). By cooperation of the guide-rail guide slots 211, 212 with the guide-rail slide blocks 221, 222, the stop element 16 is operative to move a certain distance along the longitudinal direction of the guide-rail guide slots 211, 212 (i.e. transverse to the mounting rail 11). At the bottom of the electrical equipment-insulated pedestal 12 is provided a bottom surface 13 in contact with a mounting surface of the mounting rail 11. On the bottom surface 13 is provided a locking hole 20 for bearing a locking protrusion 19 on the stop element 16 (see FIGS. 6 and 7). On the bottom surface 13 is further provided an mousing-slot 28 attached to the locking hole 20, for bearing an mousing-hook 27 on the stop element 16 (see FIGS. 6, 7). Inside the locking hole 20 is provided a vertical face 30 for clipping the locking protrusion 19 and the mousing-hook 27 on the stop element 16 (see FIGS. 6 and 7). At the entry opening of the guide-rail guide slots 211, 212 of the electrical equipment—insulated pedestal 12 is provided with a slanting face 37 for facilitating the slanting face 31 of the locking protrusion 19 and the slanting face 32 of the mousing-hook 27 on the stop element 16 to smoothly enter into the locking hole 20 or the mousing-slot 28.

From FIG. 5, it is seen that one end of the stop element 16 according to an embodiment of the present invention is provided a pair of guide-rail slide blocks 221 and 222 which are adapted for sliding into the guide-rail guide slots 211 and 212 on the electrical equipment-insulated pedestal 12 (see FIG. 3), such that the stop element 16 is operative to move a certain distance along the longitudinal direction of the guide-rail guide slots 211 and 212 (i.e. transverse to the mounting rail 11). To enable the guide-rail slide blocks 221 and 222 to smoothly enter into the guide-rail guide slots 211 and 212, on end faces of the entry ends of the guide-rail slide blocks 221 and 222 are all provided fillets 231, 232, 241 and 242.

An improved solution alternative to FIG. 5 is such that the guide-rail guide slots and the guide-rail slide blocks may switch their positions, i.e. the guide-rail guide slots are disposed on two sides of one end of the stop element, and the guide-rail slide blocks are provided on the electrical equipment-insulated pedestal.

Figure 6:
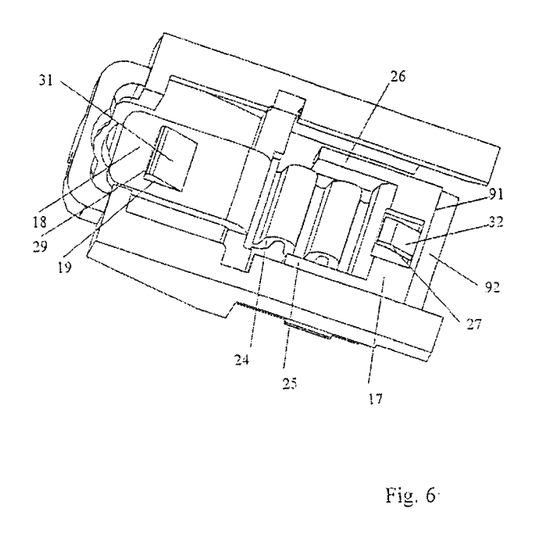
Figure 7:
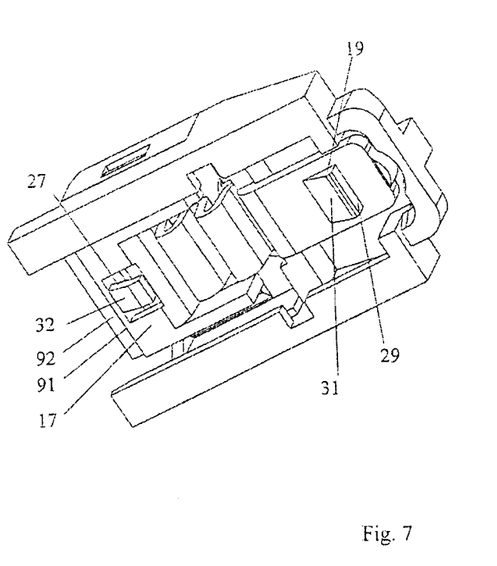

From FIGS. 6 and 7, it is seen that one end of the stop element 16 according to an embodiment of the present invention is provided an elastic link stopper 17, at the front edge of which is provided a slanting face 92 and a shoulder protrusion 91 which form an L-shaped structure in connection with an edge of the mounting rail 11 (see FIG. 2). At a middle part of the stop element 16 is provided an array of U-shaped cross-sectional elastic structure 24 which provides sufficient elasticity for the elastic link stopper 17 to clip firmly the mounting rail 11 and by elastic deformation of which, the mounting and fixing apparatus is adapted for being suitable for a TH-type mounting rail with a larger size error, thereby greatly optimizing the exchangeability and compatibility between the electrical equipment and the mounting rail. At two sides of a front part of the stop element 16 are symmetrically arranged with two elongate bars 25, 26 for preventing rotation or movement of the elastic link stopper 17 when a normally mounted electrical equipment lifts up upon the action of an external force, thereby preventing the electrical equipment from being pulled out from the mounting rail, and thereby improving the firmness and reliability of mounting the electrical equipment product. At the other end of the stop element 16 is provided a tongue-shaped plate 18 which has a locking protrusion 19 on its surface adjacent the electrical equipment-insulated pedestal 12. On the locking protrusion 19 is provided a slanting face 21 and an end face 29. When the stop element 16 is in an unlocking state, the locking protrusion 19 is outside the electrical equipment-insulated pedestal 12, or the slanting face 31 of the locking protrusion 19 and the bottom surface 13 of the electrical equipment-insulated pedestal 12 are pressed in a contact state. At this time, the stop element 16 is freely movable along the longitudinal direction of the guide-rail guide slots 211, 212, and the electrical equipment is operative to be moved, lifted up, removed or dismounted on the mounting rail 11. When the locking protrusion 19 and the locking hole 20 on the electrical equipment-insulated pedestal 12 are in overlapping position, due to the elastic action of the tongue-SHAPED plate 18, the locking protrusion 19 falls into the locking hole 20; and since the end face 29 on the locking protrusion 19 is in block contact with the vertical face 30 inside the locking hole 20, the locking protrusion 19 is locked inside the locking hole 20, thereby realizing locking of the stop element 16. When a tool like a screwdriver projects into a head portion of the stop element 16 and exerts a pressure on the tongue-shaped plate 18 so as to deform to reach a certain position, the block contact of the end face 29 on the locking protrusion 19 with the vertical face 30 inside the locking hole 20 is released, and then the stop element 16 is pulled out from the locking position, thereby realizing unlocking of the stop element 16. At the face of the elastic link stopper 17 adjacent to the electrical equipment-insulated pedestal 12 is provided a mousing-hook 27 which has a slanting face 32 thereon. The mousing-hook 27 is to prevent the stop element 16 from falling out from the electrical equipment-insulated pedestal 12, in such a manner that after the guide-rail slide blocks 221, 222 of the stop element 16 are inserted into the guide-rail guide slots 211, 212 of the electrical equipment-insulated pedestal 12, the slanting face 32 on the mousing-hook 27 is pressed into contact with the bottom surface 13 of the electrical equipment-insulated pedestal 12 and the mousing-hook 27 is in elastic deformation; and when the mousing-hook 27 overlaps the locking hole 20 on the electrical equipment-insulated pedestal 12, the elastic action of the mousing-hook 27 makes the mousing-hook 27 into the locking hole 20. At this time, if the stop element 16 is inserted further deeper, the sliding of the mousing-hook 27 inside the locking hole 20 and the mousing-slot 28 will not affect the longitudinal movement of the stop element 16; and if the stop element 16 is pulled out, the hook-shaped protrusion of the mousing-hook 27 is blocked by the vertical face 30 inside the locking hole 20, such that the stop element 16 can not be pulled out from the electrical equipment-insulated pedestal 12, thereby preventing the stop element 16 from escaping away inadvertently.

From FIG. 5, it is seen that the stop element 16 according to one embodiment of the present invention is mounted with a cover plate 32, so as to prevent the elastic link stopper 17 and the U-shaped cross sectional elastic structure 24 from being damaged by external force so as to affect the firmness and stability of mounting and fixing the electrical equipments. The connection between the cover plate 32 and the stop element 16 is realized by clipping a pair of square holes 34 on the cover plate 32 to a pair of lugs 35 on the stop element 16. Here, the cover plate 32 of the mounting and fixing apparatus according to the present invention as described here may also be default.

Hereinafter, the mounting and dismounting method of an analog-to-digital electrical equipment according to an embodiment of the present invention with reference to FIGS. 8, 9 and 10.

Figure 8:
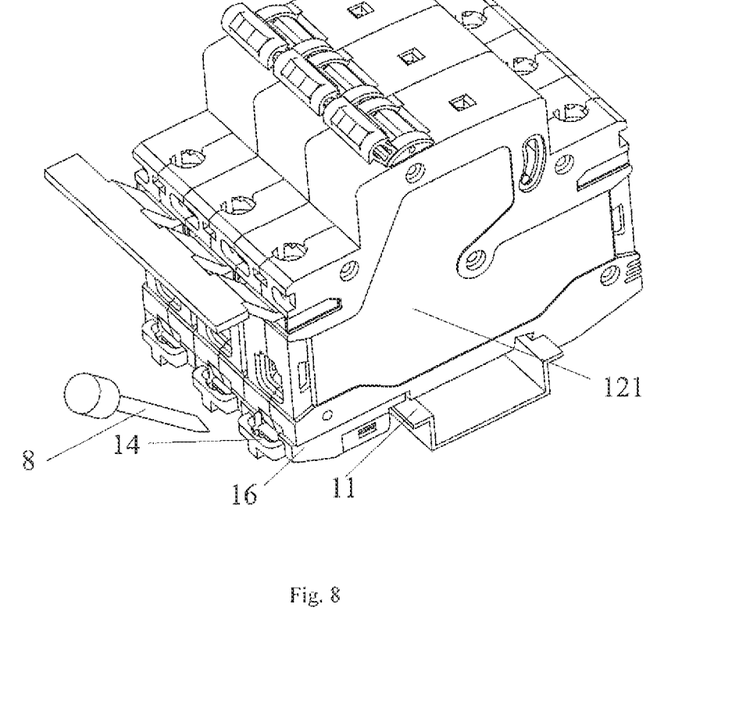
FIGS. 8, 9 and 10 are three-dimensional views showing states of each step of mounting and dismounting the analog-to-digital electrical equipment as shown in FIG. 2 according to the present invention.
Figure 9:
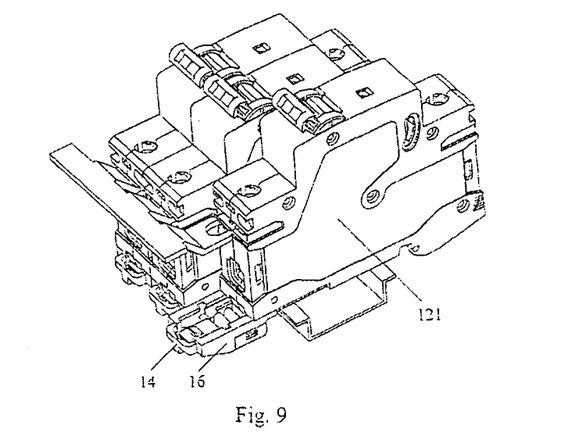
Figure 10:
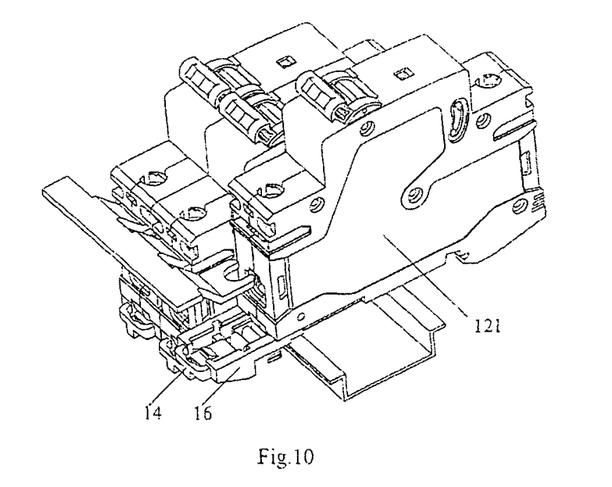

As shown in FIG. 8, after a set of electrical equipments are mounted on the TH-type mounting rail 11 and when one of electrical equipment thereof needs to be dismounted, a tool 8 like a screwdriver projects into a head portion 14 of the stop element 16 and presses down the elastic tongue-shaped plate 18 to deform it till the locking protrusion 19 on the tongue-shaped plate 18 escapes away from the locking hole 20 on the bottom surface 13 of the electrical equipment-insulated pedestal 12, and then pulls the head portion 14 of the stop element 16, such that the stop element 16 translates a certain distance outwardly, and then pushes the electrical equipment 121 to move a certain distance in a reverse direction (see FIG. 9). At this time, the electrical equipment totally loses the restriction on the mounting rail, and then lifts up the electrical equipment (see. FIG. 10), thus the electrical equipment required to be replaced can be conveniently taken off.

For the same rationale, if the electrical equipment is mounted on the TH-type mounting rail, firstly, a tool 8 like a screwdriver is necessary to project into the head portion 14 of the stop element 16, and then presses down the elastic tongue-shaped plate 18 to deform it till the locking protrusion 19 on the tongue-shaped plate 18 escapes away from the locking hole 20 on the bottom surface 13 of the electrical equipment-insulated pedestal 12, and then pulls the head portion 14 of the stop element 16, such that the stop element 16 translates a certain distance outwardly, and then places the electrical equipment to be mounted on the TH-type mounting rail 11, such that the hook structure at one end of the electrical equipment-insulated pedestal 12 is hooked to one side of the mounting rail 11. At this time, the stop element 16 is pushed to move. After a clear "ka" sound is heard, the locking protrusion 19 of the stop element 16 is locked by the locking hole 20 on the electrical equipment-insulated pedestal 12, thereby the electrical equipment is firmly mounted on the mounting rail 11.

The invention claimed is:

1. A mounting and fixing apparatus for analog-to-digital electrical equipment, comprising:
    a standardized mounting rail;
    an electrical equipment-insulated pedestal with all functional members of the electrical equipment mounted thereon, the pedestal including a locking hole provided on the bottom surface of the electrical equipment-insulated pedestal;
    a hook structure, integrally formed with the electrical equipment-insulated pedestal, the hook structure including a fixing projection and a fixing recess adapted to clip the electrical equipment-insulated pedestal on the standardized mounting rail;
    a stop element attached to one end of a bottom of the electrical equipment-insulated pedestal, the stop element including:
        an elastic link stopper at one end of the stop element, the elastic link stopper being supported on a U-shaped cross sectional elastic structure by elastic force of which the elastic link stopper clips the mounting rail, and two sides of the elastic link stopper being further provided elongate bars adapted to prevent rotation or displacement of the elastic link stopper under external force;
        an L-shaped structure provided on the elastic stopper, the L-shaped structure formed by a shoulder projection and a slanting face and attached to the mounting rail, the L-shaped structure working together with the hook structure provided on the other end of the bottom of the electrical equipment-insulated pedestal to fixedly clip the electrical equipment-insulated pedestal on the standardized mounting rail; and
        a locking protrusion formed on the stop element and cooperating with the locking hole to lock the stop element on the electrical equipment-insulated pedestal when the locking protrusion falls into the locking hole, locking the equipment-insulated pedestal on the mounting rail when the locking protrusion falls into the locking hole, the L-shaped structure, the elastic link stopper, the U-shaped cross sectional elastic structure, the elongate bars, and the stop element being integrally formed as one piece; and a pair of guide-rail structures adapted to attach the electrical equipment-insulated pedestal to the stop element, such that the stop element is adapted to translate smoothly between a locking position and an unlocking position by virtue of the guide-rail structures, the pair of guide-rail structures including first guide-rail structure portions on the electrical equipment-insulated pedestal and second guide-rail structure portions on the stop element, the second guide-rail structure portions elastically coupled to the L-shaped structure by the U-shaped cross sectional elastic structure;

wherein the electrical equipment-insulated pedestal is mounted and fixed on the mounting rail by locking the stop element and the electrical equipment-insulated pedestal, and wherein the stop element is adapted to translate on the electrical equipment-insulated pedestal by manually releasing the locking of the stop element and the electrical equipment-insulated pedestal, thereby varying a distance between the hook structure and the L-shaped structure on the stop element, such that the electrical equipment is adapted for being dismounted from the mounting rail or being rearranged on the mounting rail.

2. The mounting and fixing apparatus for analog-to-digital electrical equipment according to claim 1, wherein the first guide-rail structure portions comprise a pair of guide-rail guide slots provided on the electrical equipment-insulated pedestal, and the second guide-rail structure portions comprise a pair of guide-rail slide blocks provided on two sides of one end of the stop element, at an entrance end of the guide-rail slide blocks or at an entry end of the guide-rail guide slots being provided fillets which facilitate the guide-rail slide blocks to be guided into the guide-rail guide slots.

3. The mounting and fixing apparatus for analog-to-digital electrical equipment according to claim 1, wherein the second guide-rail structure portions comprise a pair of guide-rail guide slots provided on two sides of one end of the stop element and the first guide-rail structure portions comprise a pair of guide-rail slide blocks provided on the electrical equipment-insulated pedestal, at an entrance end of the guide-rail slide blocks or at an entry end of the guide-rail guide slots being provided fillets which facilitate the guide-rail slide blocks to be guided into the guide-rail guide slots.

4. The fixing and mounting apparatus for analog-to-digital electrical equipment according to claim 1, wherein:

the locking protrusion is provided on an elastic tongue-shaped plate of the stop element;

a slanting face is provided on a face at one side of the locking protrusion adjacent to the elastic link stopper, and an end face is provided on one side of the locking protrusion adjacent to a head portion;

the elastic tongue-shaped plate is elastically deformed by pressing the slanting face to be in contact with the bottom surface of the electrical equipment-insulated pedestal, the end face and a vertical face inside the locking hole on the electrical equipment-insulated pedestal arranged so that contact between the end face and the vertical face locks the stop element on the electrical equipment-insulated pedestal, locking the electrical equipment-insulated pedestal on the mounting rail when the locking protrusion falls into the locking hole; and the locking protrusion, elastic tongue-shaped plate and stop element are integrally formed into one piece.

5. The fixing and mounting apparatus for analog-to-digital electrical equipment according to claim 4, wherein a mousing-hook is provided on a face of the stop element adjacent to the electrical equipment-insulated pedestal;

a mousing-slot attached to the locking hole is provided on the electrical equipment-insulated pedestal, for bearing the mousing-hook on the stop element, such that the mousing-hook is adapted to move inside the locking hole and the mousing-slot at the bottom surface of the electrical equipment-insulated pedestal;

the vertical face disposed inside the locking hole is operable to block the locking protrusion and the mousing-hook on the stop element;

the mousing-hook is integrally formed with the elastic link stopper, to prevent the stop element from escaping away from the electrical equipment-insulated pedestal; and a slanting face is provided on a face of the mousing-hook adjacent to one end of the electrical equipment-insulated pedestal, to facilitate the stop element to be pressed and mounted into the electrical equipment-insulated pedestal.

6. The fixing and mounting apparatus for analog-to-digital electrical equipment according to claim 4, wherein the locking hole and mousing-slot are the same hole or slot.

7. The fixing and mounting apparatus for analog-to-digital electrical equipment according to claim 1, wherein a mousing-hook is provided on a face of the stop element adjacent to the electrical equipment-insulated pedestal;

a mousing-slot attached to the locking hole is provided on the electrical equipment-insulated pedestal, for bearing the mousing-hook on the stop element, such that the mousing-hook is adapted to move inside the locking hole and the mousing-slot at the bottom surface of the electrical equipment-insulated pedestal;

the vertical face disposed inside the locking hole is operable to block the locking protrusion and the mousing-hook on the stop element;

the mousing-hook is integrally formed with the elastic link stopper, to prevent the stop element from escaping away from the electrical equipment-insulated pedestal; and a slanting face is provided on a face of the mousing-hook adjacent to one end of the electrical equipment-insulated pedestal, to facilitate the stop element to be pressed and mounted into the electrical equipment-insulated pedestal.

8. The fixing and mounting apparatus for analog-to-digital electrical equipment according to claim 7, wherein the locking hole and mousing-slot are the same hole or slot.

9. The fixing and mounting apparatus for analog-to-digital electrical equipment according to claim 1, wherein the locking hole and mousing-slot are the same hole or slot.

10. The fixing and mounting apparatus for analog-to-digital electrical equipment according to claim 1, wherein the electrical equipment-insulated pedestal is a transitional piece for attaching the terminal electrical equipment product body to the mounting rail.

11. The fixing and mounting apparatus for analog-to-digital electrical equipment according to claim 1, wherein the electrical equipment-insulated pedestal is integrally manufactured with the terminal electrical equipment product.

12. The fixing and mounting apparatus for analog-to-digital electrical equipment according to claim 1, wherein the stop element is provided a lug adapted for mounting a protective cover plate, for fixing and mounting the protective cover plate with a square hole, the protective cover plate being mounted to the stop element by clipping the square hole and the lug on the stop element.

* * * * *